(12) United States Patent
Logan et al.

(10) Patent No.: US 11,479,492 B2
(45) Date of Patent: Oct. 25, 2022

(54) FAST FLOW DEWATERING TRAILER APPARATUS AND METHOD OF USE

(71) Applicant: AFCO 360, LLC, Lake Charles, LA (US)

(72) Inventors: Adrian Logan, Lacassine, LA (US); Brett Feldes, Lake Charles, LA (US)

(73) Assignee: AFCO 360, LLC, Lake Charles, LA (US)

( * ) Notice: Subject to any disclaimer, the term of this patent is extended or adjusted under 35 U.S.C. 154(b) by 28 days.

(21) Appl. No.: 17/205,983

(22) Filed: Mar. 18, 2021

(65) Prior Publication Data

US 2021/0292207 A1 Sep. 23, 2021

Related U.S. Application Data

(60) Provisional application No. 62/991,340, filed on Mar. 18, 2020.

(51) Int. Cl.
*C02F 11/128* (2019.01)
*C02F 11/122* (2019.01)

(52) U.S. Cl.
CPC .......... *C02F 11/128* (2013.01); *C02F 11/122* (2013.01); *C02F 2201/005* (2013.01); *C02F 2201/008* (2013.01); *C02F 2209/10* (2013.01); *C02F 2209/40* (2013.01)

(58) Field of Classification Search
CPC ................. C02F 11/122; C02F 11/128; C02F 2201/005; C02F 2201/008; C02F 2209/10; C02F 2209/40
See application file for complete search history.

(56) References Cited

U.S. PATENT DOCUMENTS

| 4,836,921 A | 6/1989 | Hahn et al. |
| 5,494,584 A | 2/1996 | McLachlan et al. |
| 5,503,753 A | 4/1996 | Woodall et al. |
| 5,589,081 A | 12/1996 | Harris |
| 5,626,766 A | 5/1997 | Cadek et al. |
| 5,681,460 A | 10/1997 | Caughman |
| 5,695,645 A | 12/1997 | Bober et al. |
| 5,707,535 A | 1/1998 | Harris |

(Continued)

FOREIGN PATENT DOCUMENTS

WO WO2017044028 A1 3/2017

OTHER PUBLICATIONS

"Aqua-Zyme Disposal SystemS" pumper.com https://www.pumper.com/editorial/2012/11/flow_control (Nov. 2012).

(Continued)

*Primary Examiner* — Terry K Cecil
(74) *Attorney, Agent, or Firm* — Schultz & Associates, P.C.

(57) ABSTRACT

A lightweight aluminum container body is provided which is typically of much greater length than the prior art. The container body which has a series of removable filter sections is provided. The container body which includes a top pivoting rear gate sealed by dual hydraulic piston arrangement and manual vice locks is provided. The container body having a central wall supporting a novel manifold and inlet drain offset system is provided which automatically controls the sludge and inlet drain flow in a way that positionally balances sediment deposit.

18 Claims, 14 Drawing Sheets

(56) References Cited

U.S. PATENT DOCUMENTS

| | | |
|---|---|---|
| 6,004,461 A | 12/1999 | Harris |
| 6,146,528 A | 11/2000 | Caughman et al. |
| 6,258,268 B1 | 7/2001 | Lake |
| 6,354,328 B1 | 3/2002 | Roberts |
| 6,364,122 B1 | 4/2002 | Massey |
| 6,627,434 B1 | 9/2003 | McNelly |
| 6,652,757 B2 | 11/2003 | Hodges et al. |
| 6,808,626 B2 | 10/2004 | Kulbeth |
| 7,179,377 B1 | 2/2007 | Caughman |
| 7,240,681 B2 | 7/2007 | Saik |
| 7,288,192 B2 | 10/2007 | Jowett |
| 7,410,576 B2 | 8/2008 | Brouillard et al. |
| 7,544,287 B2 | 6/2009 | Harris |
| 7,578,930 B2 | 8/2009 | Williamson et al. |
| 7,820,045 B2 | 10/2010 | Caughman |
| 7,943,051 B2 | 5/2011 | Dieziger |
| 8,007,665 B2 | 8/2011 | Kamiyama |
| 8,070,960 B2 | 12/2011 | Conwell |
| 8,147,689 B1 | 4/2012 | Cogar |
| 8,261,918 B1 | 9/2012 | Powell et al. |
| 8,317,036 B2 | 11/2012 | Roberts |
| 8,337,707 B2 | 12/2012 | Wold |
| 8,518,268 B1 | 8/2013 | Nauertz |
| 8,673,156 B2 | 3/2014 | Griffin et al. |
| D714,691 S | 10/2014 | Costello et al. |
| D714,692 S | 10/2014 | Costello et al. |
| 9,149,741 B2 | 10/2015 | Mcphee |
| D746,943 S | 1/2016 | Hart |
| 9,731,987 B2 | 8/2017 | Richie et al. |
| 9,795,901 B2 | 10/2017 | Downey et al. |
| 9,828,272 B2 | 11/2017 | Krieger |
| 9,902,633 B2 | 2/2018 | Reilly et al. |
| 9,926,132 B2 | 3/2018 | Downey et al. |
| 10,022,656 B2 | 7/2018 | Day |
| 10,155,181 B2 | 12/2018 | Dawson et al. |
| 10,179,300 B2 | 1/2019 | Cox et al. |
| 10,183,805 B2 | 1/2019 | Downey et al. |
| 10,202,289 B1 | 2/2019 | Lopez et al. |
| 10,207,209 B1 | 2/2019 | Toft |
| 10,369,496 B2 | 8/2019 | Kent |
| 10,994,227 B2 * | 5/2021 | Ros ................ B01D 29/05 |
| 2006/0081544 A1 | 4/2006 | Hong |
| 2010/0243575 A1 | 9/2010 | Nowling |
| 2012/0312755 A1 | 12/2012 | Ryan et al. |
| 2014/0151306 A1 | 6/2014 | Downey et al. |
| 2018/0036661 A1 | 2/2018 | Anthony et al. |
| 2018/0065064 A1 | 3/2018 | Coulton |
| 2018/0134594 A1 | 5/2018 | Reilly et al. |
| 2019/0070526 A1 | 3/2019 | Dawson et al. |
| 2019/0376743 A1 | 12/2019 | Squires et al. |
| 2020/0030721 A1 | 1/2020 | Ros et al. |

OTHER PUBLICATIONS

"I.D.S. Enterprises dewatering filter box" pumper.com https://www.pumper.com/editorial/2012/09/product_news_september_2012 (Sep. 2012).

* cited by examiner

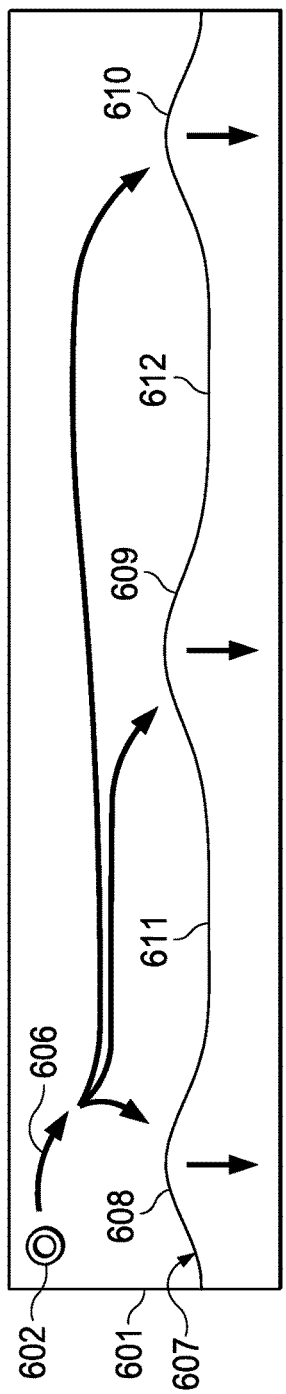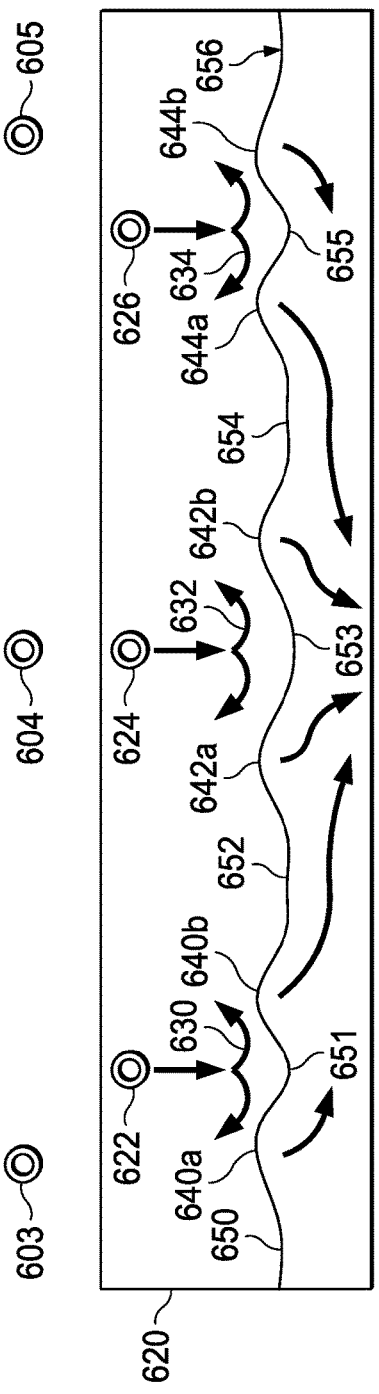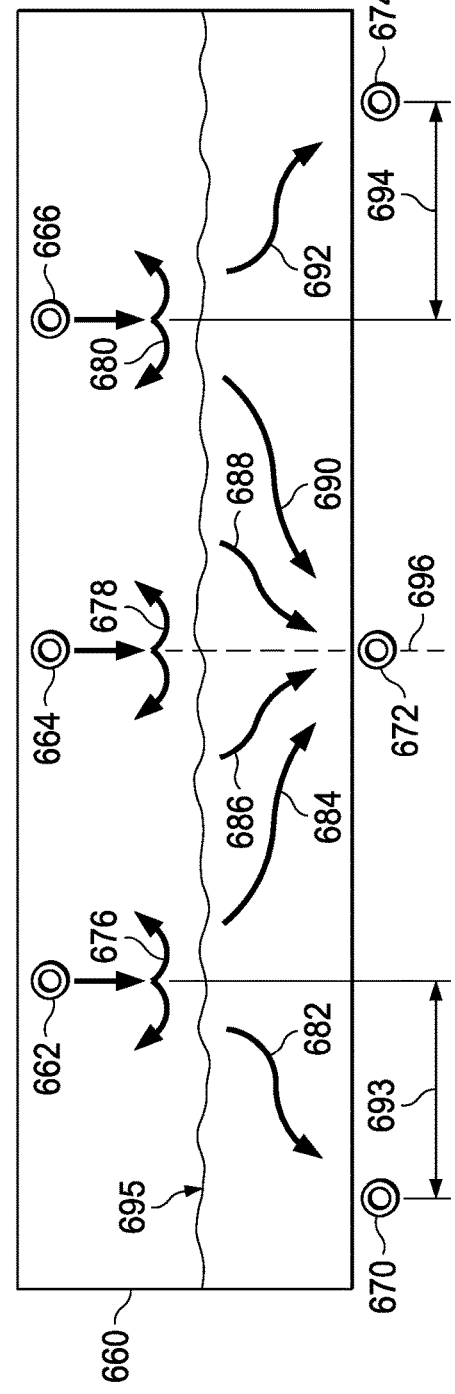

FAST FLOW DEWATERING TRAILER APPARATUS AND METHOD OF USE

CROSS-REFERENCE TO RELATED APPLICATIONS

This application claims priority benefit from U.S. Provisional Application No. 62/991,340, filed on Mar. 18, 2020. The patent application identified above is incorporated here by reference in its entirety to provide continuity of disclosure.

FIELD OF THE INVENTION

The present invention relates to sludge dewatering systems.

BACKGROUND OF THE INVENTION

Before 1950, most municipal communities in the United States discharged their wastewater into streams and rivers with little if any treatment. As urban populations increased, the natural ability of streams and rivers to handle the wastewater was overwhelmed and caused water quality to deteriorate in many regions. In response to concerns about water quality degradation, thousands of communities throughout the United States constructed wastewater treatment plants during the 1950s and 1960s. Approximately 99% of the wastewater stream that enters a treatment plant is discharged as rejuvenated water. But, the remainder is a dilute suspension of solids. These solids are commonly referred to as sewage sludge.

By 1990, the average per capita usage from public water supply systems in the United States was 184 gallons per day. In some areas, wastewater flow exceeds the per capita usage because of stormwater infiltration into wastewater collection systems. Assuming 85% of per capita usage is wastewater production, a city of 200,000 people produces an average of about 31,000,000 gallons of raw wastewater every day.

The volume of sewage sludge produced by wastewater treatment facilities varies as a result of the sludge treatment process used. However, typical primary and secondary wastewater treatment processes produce a total of about 1.95 lbs. of dry solids for every 1,000 gallons of wastewater treated.

Treatment and disposal of sewage sludge are major factors in the design and operation of all wastewater treatment plants. Two basic goals of treating sludge before final disposal are to reduce its volume and to stabilize the organic materials. Once stabilized, sludge has no offensive odor and can be handled without causing a nuisance or health hazard. Reduced sludge volume lowers the cost of pumping and storage.

Municipal wastewater treatment plants typically carry out preliminary, primary, secondary, tertiary treatment. Resulting sludge is then treated as required for use in agriculture or disposal.

Preliminary wastewater treatment ordinarily includes screening and grit removal. Wastewater screening removes coarse solids such as rags and plastics that would otherwise interfere with mechanical equipment. Grit removal separates heavy, inorganic, sandlike solids that would settle in channels and interfere with treatment processes.

Secondary wastewater treatment is accomplished by biological processes that remove biodegradable organic materials. The biological processes generally comprise of microorganisms in suspension attached to filter media or in ponds. The microorganisms oxidize the organic material to produce carbon dioxide and other end products. The microorganisms then flocculate to form settleable sediment. The sediment usually forms a concentrated suspension called secondary sludge.

Wastewater constituents can become associated with secondary sludge as a result of microbial assimilation, by sorption onto settleable solids, or by incorporation into agglomerate particles formed as a result of bioflocculation. Some of the wastewater constituents that are incidentally associated with the biomass from secondary treatment processes include pathogens, trace elements, and organic compounds.

Tertiary treatment is used when wastewater conditions require higher quality effluent than that produced by secondary wastewater treatment. Disinfection for control of pathogenic microorganisms and viruses is the most common type of tertiary treatment. The concentrations of suspended solids in treated effluent can be reduced by filtration, sometimes with the aid of a coagulant. Activated carbon is generally used to remove persistent organic compounds and trace elements. The concentration of ammonia in secondary effluent can be reduced by nitrification. Tertiary treatment to remove nitrogen and phosphorus, so as to minimize nutrient enrichment of surface waters, is also common. Nitrogen is usually removed by nitrification followed by denitrification. Phosphorus is removed by microbial uptake or chemical precipitation. The residues from tertiary treatment typically become incorporated with sludges from primary and secondary treatment.

Primary, secondary and tertiary sludges contain settleable materials from raw wastewater and the products of microbial synthesis. Other materials are also removed from wastewaters and incorporated into sludges. The large surface area of particles incorporated into sludges provides sites for adsorption of constituents from the liquid phase. Nondegraded organic compounds in solution may partition into the organic fraction of the particles. Bioflocculation may incorporate colloidal particles that otherwise would not be removed by sedimentation into settleable particles. Wastewater constituents remaining in the liquid phase also are included in sludges.

A wide variety of sludge treatment processes are used to reduce sludge volume and alter sludge properties prior to disposal or use.

Biological sludge, as produced from secondary wastewater treatment processes, often has a suspended solids content of less than one percent by weight. Primary sludges are more concentrated, but marginally so; typical combined primary and secondary sludge might contain about 3 percent solids by weight. Because of the voluminous nature of sludges, typical reduction processes include thickening, dewatering, conditioning, and drying. Removal of water from sludges improves efficiency of subsequent treatment processes, reduces storage volume, and decreases transportation costs.

Sludge dewatering processes produce material with the properties of a solid, even though the dewatered sludge is still mostly water. Dewatered sludge can be transported in a dump truck, whereas a tank truck is required to transport thickened sludge. Dewatering may be accomplished on sand drying beds and, occasionally, in lagoons, where gravity drainage and evaporation removes moisture. Other mechanical means to conduct sludge dewatering are also widely employed.

The options for ultimate use or disposal of dried sewage sludges are quite restricted. In the United States, the Clean Water Act and the Ocean Dumping Ban Act eliminate all but land-based options for ultimate use or disposal of dried sludges. Any attempt to extract and recycle materials from sludges is unrealistic due to the highly heterogeneous nature of municipal wastewater sludge. With the exception of sludge ash used in building materials, municipal wastewater sludges currently are land-applied for beneficial uses or disposed of on the land. Disposal on land includes landfilling and permanent storage of dewatered sludge or sludge incinerator ash in lagoons or piles.

Sludge dewatering is only justified when its cost is offset by savings in transportation costs.

It is estimated that publicly owned municipal wastewater treatment plants operating in the United States today generate about 0.16 lbs., dry weight, of sewage sludge each day for every person that the sewerage system services. For example, if a metropolitan population is near 12 million, and approximately 85% of its residents live in metropolitan areas serviced by centralized sewerage systems, municipal wastewater treatment plants will generate approximately 300,000 tons of sewage sludge, dry weight, each year.

From a management and materials handling perspective, landfilling is typically the simplest solution for disposal of the dried sewage sludge. From an economic standpoint, landfilling presently compares favorably with other options. This undoubtedly will change, however, as landfill space becomes more limited and tipping fees (waste-dumping costs) increase.

The Environmental Protection Agency (EPA) estimates that the costs for sludge handling and disposal account for 40% to 60% of the total budget for a municipal wastewater treatment facility, and increasing. Tipping fees account for 50% to 75% of the sludge-related costs.

A "tipping fee", or a "gate fee", is the charge levied on a given quantity of waste received at a waste processing facility. In the case of a landfill, it is generally levied to offset the cost of opening, maintaining and eventually closing the site. It may also include any landfill tax which is applicable in the region Tipping fees are expensive. It has been reported that the average tipping fee rose 5.2 percent from 2018 to 2019 to $55.36 per ton. In 2019, sludge tipping fees in the United States range from $40 per ton to $73 per ton.

Hence, there is a need in the art for a portable dewatering solution that maximizes the amount of dried sludge cake that may be transported from a municipal water cleaning site to a landfill, thereby reducing tipping costs and minimizing overall treatment time and expenditures.

The prior art has attempted many solutions for the management, processing and transportation of sewage sludge. For example, U.S. Pat. No. 8,261,918 to Powell, discloses a container for facilitating solid phase liquid phase separation for sludge waste products. A plastic center wall is disclosed which increases the surface area of the filter available to separate the solid and liquid phases. Drains in the floor of a central container provided for elimination of wastewater from the sludge material. The filter is supported by a roll off rectangular container, which is designed to be loaded on the bed of a truck. The drainage system is positioned along a center line of the container beneath the plastic separator wall. A plastic conduit removes drained liquid from the container. However, Powell does not provide for a balanced way to introduce sludge or chemical additives into the container or a way to balance sediment deposit.

U.S. Pat. No. 5,589,081 to Harris likewise discloses a liquid solid separator tank having a bed with a drain and surrounding sides, which enclose a dividing wall. A single grate overlays the interior of the container, including the bed and the sides. A filter overlays the grate, extending up the sides and overlapping the dividing wall. Liquid is drained from the container out of the bottom of the vessel through centrally located channels routed to drains located below the level of the bed. No disclosure is provided of a structure or method to introduce liquid and solid sludge into the container or to balance sediment deposit.

U.S. Pat. No. 5,503,753 to Woodall provides a trailer based container for dewatering waste, which is tilt mounted on a portable frame. A series of internal pipes accomplish dewatering of waste and movement toward the rear of the chamber. When a preferred quantity of waste is contained in the first chamber of the tank, the tank is tilted which forces solids to a corner where upon clean water is moved to a second chamber. The liquid water migrates to the last compartment where it is considered clean and is removed from the tank.

U.S. Pat. No. 10,155,181 to Dawson, et al. discloses a tank trailer used for disposing waste material from an oil and gas site. Waste material is introduced into a mobile vessel which can include sludge waste material. Dawson further discloses a detachable lifting mechanism to lift the trailer, whereby its interior may be accessed by a hinged gate at the rear.

SUMMARY OF THE INVENTION

In a preferred embodiment of the invention, a lightweight aluminum container body is provided, which is typically of much greater length than the prior art. The aluminum body reduces trailer weight, thereby accommodating larger sludge loading during transport.

The container body houses a series of filter sections on the interior of each side wall and along a central wall. Each of the filter sections is further comprised of removable filter panels, which may be individually replaced when damaged. The replacement of individual filter panels reduces maintenance cost by extending the useful life of non-damaged filter sections.

The container body preferably includes a top pivoting rear gate, also comprised of aluminum sheet, which is sealed against the rear of the container body by a dual hydraulic piston arrangement, including manual vise locks to assure an unbroken gate seal during use.

The central wall and the floor frame of the container body support a novel manifold and inlet drain offset system, which automatically controls liquid sludge inlet and drain flow in a way that positionally balances sediment deposit during use. The balanced sediment deposit assures that the container body is completely full before each transport of dried sludge cake for disposal, thereby reducing the number of trips required and the number of tipping fees charged for any given amount of dewatered sludge.

Of course, these and other novel features will be more fully described in the complete specification and drawings attached hereto.

BRIEF DESCRIPTION OF THE DRAWINGS

In the detailed description of the preferred embodiments presented below, reference is made to the accompanying drawings.

FIG. 6A is a schematic side view of sediment deposit in a dewatering container having a single inlet and multiple outlets.

FIG. 6B is a schematic side view of sediment deposit in a dewatering container having a multiple inlet and a single outlet.

FIG. 6C shows a schematic view of a dewatering container employing a forward inlet drain offset, a central inlet drain planar alignment and an aft inlet drain offset of a preferred embodiment resulting in a positionally balanced sediment deposit.

DETAILED DESCRIPTION OF THE INVENTION

In the description that follows, like parts are marked throughout the specification and figures with the same numerals, respectively. The figures are not necessarily drawn to scale and may be shown in exaggerated or generalized form. Unless otherwise noted the word "about" means ±5%.

Figure 1:
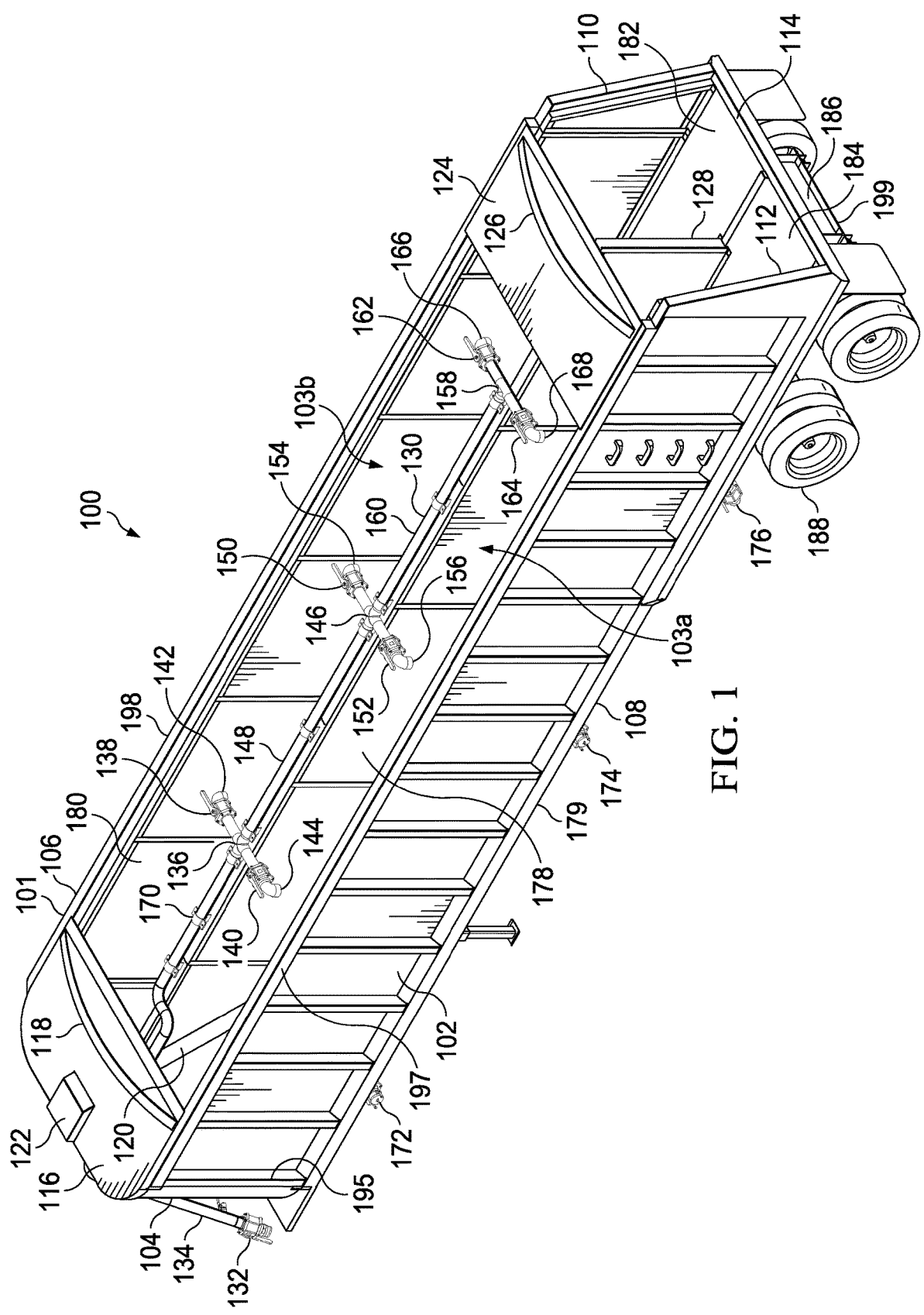
FIG. 1 is a rear isometric view of a preferred embodiment of the even flow dewatering trailer.

Referring then to FIG. 1, even flow dewatering trailer 100 will be described. In this Figure, the rear gate is not shown for clarity.

Even flow dewatering trailer 100 is comprised of sidewall 102, front wall 104, sidewall 106, and floor frame 108. The front wall is permanently welded to each of the side walls. Each of the sidewalls and the front wall are permanently welded to the floor frame. Sidewall 106 terminates in gate seal 110. Sidewall 102 terminates in gate seal 112. Floor frame 108 terminates in gate seal 114. Each gate seal accommodates a rear gate (not shown), as will be further described. Sidewall 102, front wall 104, and sidewall 106, further support walkway 116. Walkway 116 further supports cover support 118. Front wall 104 and floor frame 108 further support hoist box 120, which terminates in lift cylinder connector plate 122, as will be further described. Sidewall 102 and sidewall 106 further support walkway 124. Walkway 124 supports cover support 126. Cover support 126 and cover support 118 cooperate to support a fabric trailer cover, not shown.

Floor frame 108, walkway 116 and walkway 124 further support center wall 128, as will be further described. Center wall 128 positions manifold 130 above floor frame 108. In a preferred embodiment, center wall 128 is about 5 feet tall.

Center wall 128 and sidewall 102 define port bay 103a. Center wall 128 and sidewall 106 define starboard bay 103b.

Manifold 130 further comprises inlet valve 132 connected by inlet pipe 134 to cross fitting 136. In a preferred embodiment, the cross fitting is positioned about 8 feet from the front wall. Cross fitting 136 is further connected to valve 138 and valve 140. Valve 138 is fitted to nozzle 142. Valve 140 is fitted to nozzle 144. In a preferred embodiment, the nozzles are diametrically opposed and are each directed downward at an angle generally parallel to the center wall and the front wall. Nozzle 142 is centrally located between sidewall 106 and center wall 128. Likewise, nozzle 144 is centrally located between sidewall 102 and center wall 128. Cross fitting 136 is further connected to cross fitting 146 by pipe 148. In a preferred embodiment, the cross fitting is about 16 feet from the front wall. Cross fitting 146 is further connected to valve 150 and valve 152. Valve 150 is connected to nozzle 154. Valve 152 is connected nozzle 156. In a preferred embodiment, the nozzles are diametrically opposed and are each directed downward at an angle generally parallel to the center wall and the front wall. In a preferred embodiment, nozzle 142 is centrally located between sidewall 106 and center wall 128, and likewise nozzle 144 is centrally located between sidewall 102 and center wall 128. Cross fitting 146 is connected to t-fitting 158 by pipe 160. In a preferred embodiment, the t-fitting is positioned about 24 feet from the front wall. T-fitting 158 is operatively connected to valve 162 and valve 164. Valve 162 is connected to nozzle 166. Valve 164 is connected to nozzle 168. In a preferred embodiment, nozzle 166 is centrally located between sidewall 106 and center wall 128. Likewise, nozzle 168 is centrally located between sidewall 102 and center wall 128. The nozzles are preferably diametrically opposed. In a preferred embodiment, the nozzles are diametrically opposed and are each directed downward at an angle generally parallel to the central wall and the front wall.

Manifold 130 is secured to center wall 128 by rigid support brackets 170.

Center wall 128 operatively supports removeable central filter sections 178, as will be further described. Sidewall 106 operatively supports removable filter sections 180, as will be described. Floor frame 108 further supports low friction floor sections 182 and 184, as will be further described.

Floor frame 108 is pivotally supported by half frame 186. Half frame 186 is supported by road wheels 188, as will be further described.

Figure 2:
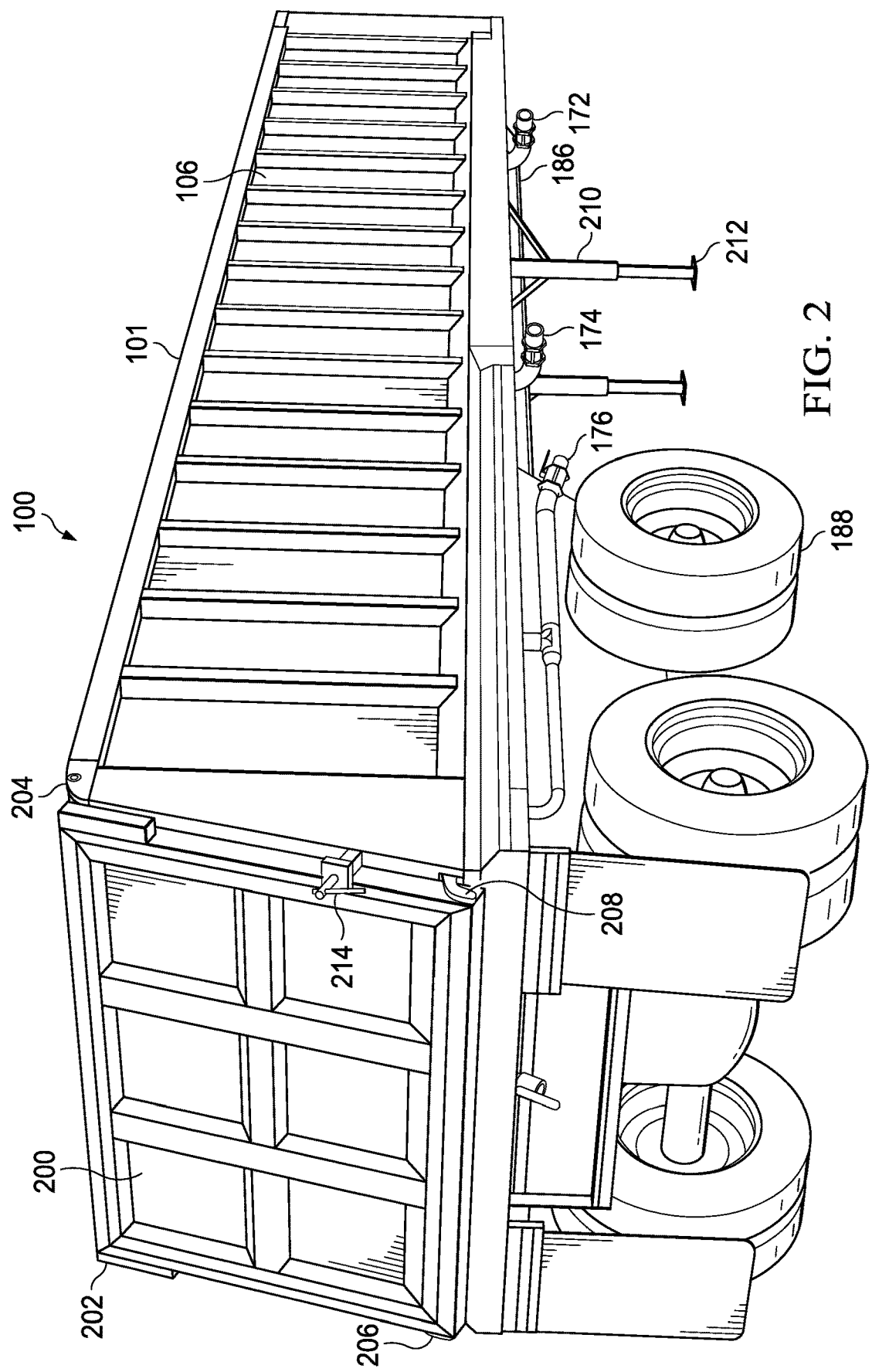
FIG. 2 is a rear isometric view of a preferred embodiment of the even flow dewatering trailer.

Referring then to FIG. 2, rear gate 200 is connected to sidewalls 102 and 106 through top oriented gate pivot hinges 202 and 204, respectively. Rear gate 200 is held in position against gate seal 110, gate seal 114 and gate seal 112 by gate latch 206 and gate latch 208. In a preferred embodiment, gate latch 206 and gate latch 208 are pneumatically actuated. In a further preferred embodiment, rear gate 200 is sealed into position against the gate seals with manual vice lock 214. More than one vice lock may be deployed around the perimeter of the gate in other embodiments. The vice locks prevent the gate from opening during transport if one or more of the gate latches fails.

Half frame 186 further comprises retractable landing gear 210. Retractable landing gear 210 is provided with sandshoes 212.

Figure 3:
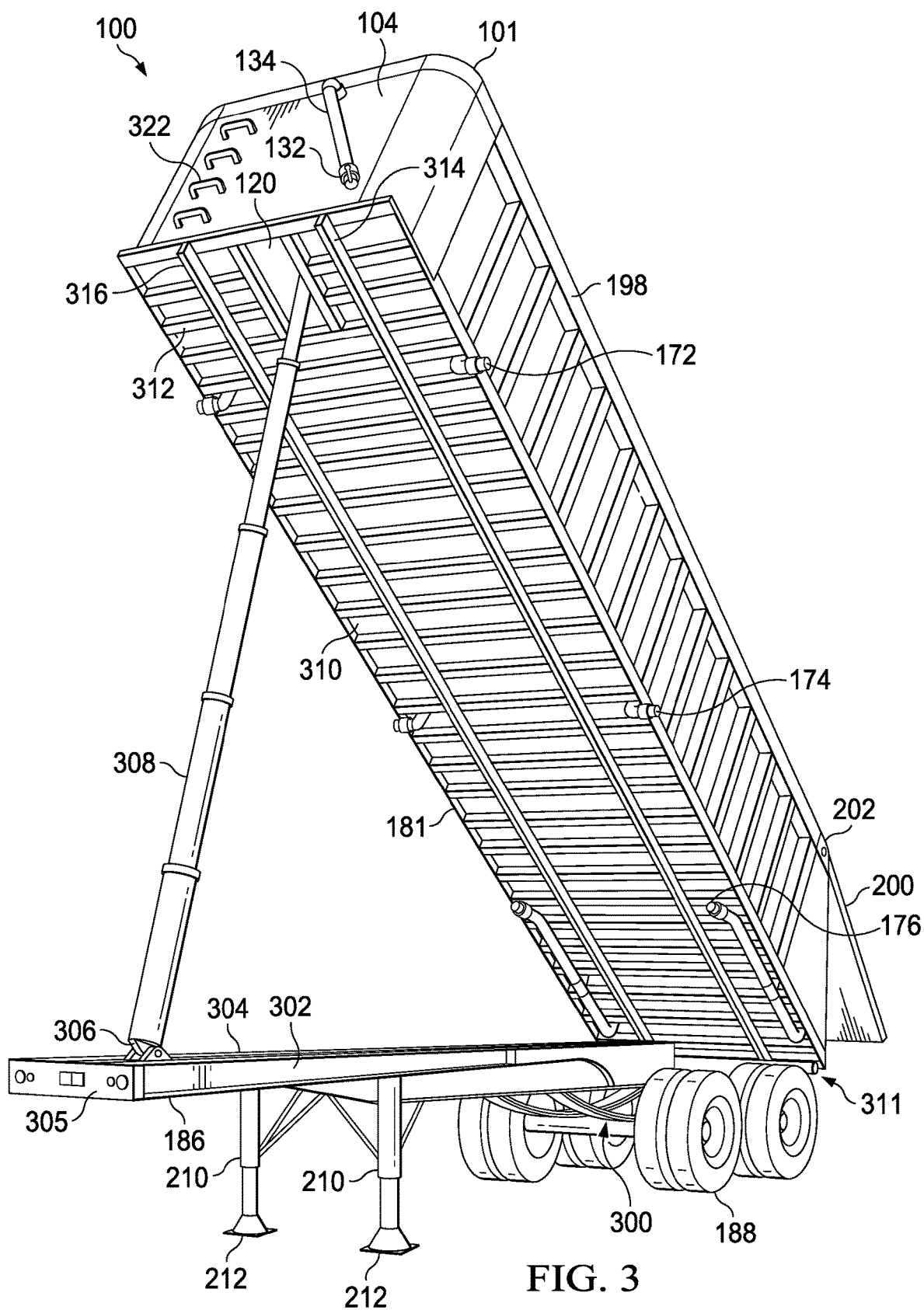
FIG. 3 is an isometric view of a preferred embodiment of the even flow dewatering trailer in a raised dump position.

Referring then to FIG. 3, even flow dewatering trailer 100, will be further described.

Half frame 186 is further comprised of I-beam 304 and I-beam 302. I-beam 302 and I-beam 304 are generally parallel. I-beam 302 and I-beam 304 are rigidly connected by front beam 305 and rear beam 199, preferably by welding. I-beam 304 and I-beam 302 support landing gear 210. Pivoted hoist mount 306 is operatively fixed between I-beam 302 and I-beam 304. Pivoted hoist mount 306 supports hoist lift cylinder 308. Hoist lift cylinder 308 is further pivotally mounted within hoist box 120, to the bottom side of lift cylinder connector plate 122. I-beam 302 and I-beam 304 further support suspension assembly 300. Suspension assembly 300 operatively supports road wheels 188.

Considering FIGS. 1, 2 and 3, container body 101 further comprises steps 322 rigidly fixed on front wall 104. The steps provide support for a user to attach a trailer cover (not shown) and to access manifold 130 for valve tuning, as will be further described. Floor 310 is supported by a plurality of cross-members 312. The plurality of cross-members are welded to longitudinal beam 316 and longitudinal beam 314 at about 90° angles. The plurality of cross-members are also each welded between rub rail 179 and rub rail 181, at approximately 2 foot centers.

Container body 101 is pivotally attached to half frame 186 at rear beam 199 by trailer pivot assembly 311.

In a preferred embodiment, floor 310 is constructed of 0.250 inch high temperature aluminum alloy, 5454-H34. In another preferred embodiment, floor 310 may be constructed of 0.375 inch high temperature aluminum alloy 5454-H34. In a preferred embodiment, sidewall 102 and sidewall 106 are comprised of 0.150 inch high temperature aluminum alloy 5454-H32. Likewise, preferably front wall 104 is comprised of 0.250 inch high temperature aluminum alloy 5454-H32 with 3.5×⅝ inch thick banding alloy 6062-T6. In a preferred embodiment, rear gate 200 is comprised of 0.190 inch high temperature aluminum alloy 5454-H3.

Preferably, hoist box 120 is constructed of 0.250 inch high temperature aluminum alloy 5454-H32 with appropriate nose and floor gusset bracing.

Half frame 186 is comprised of 18 inch steel I-beam stock having 6×1½ inch flange and ⅜ inch web. Likewise, suspension assembly 300 is supported by ⅝ inch flange×⅜ inch web aluminum alloy 6061-T6 to a depth of 18 inches. Landing gear 210 is preferably comprised of steel tubing 3½ inch square tube by 3/16 inch wall upper and 3 inch square tube by 3/16 inch wall lower.

Suspension assembly 300 preferably includes four (4) spring hutch H-9700 50,000 lb. capacity full span leaf springs. Axle assembly 522 preferably comprises a pair of Arvin Meritor TQ-4770-LH, ⅝ wall, 25,000 lb. capacity axles.

Preferably, hoist lift cylinder 308 is comprised of a custom five stage 8 inch nested hydraulic cylinder with approximately 50,000 lb. capacity.

Figure 4A:
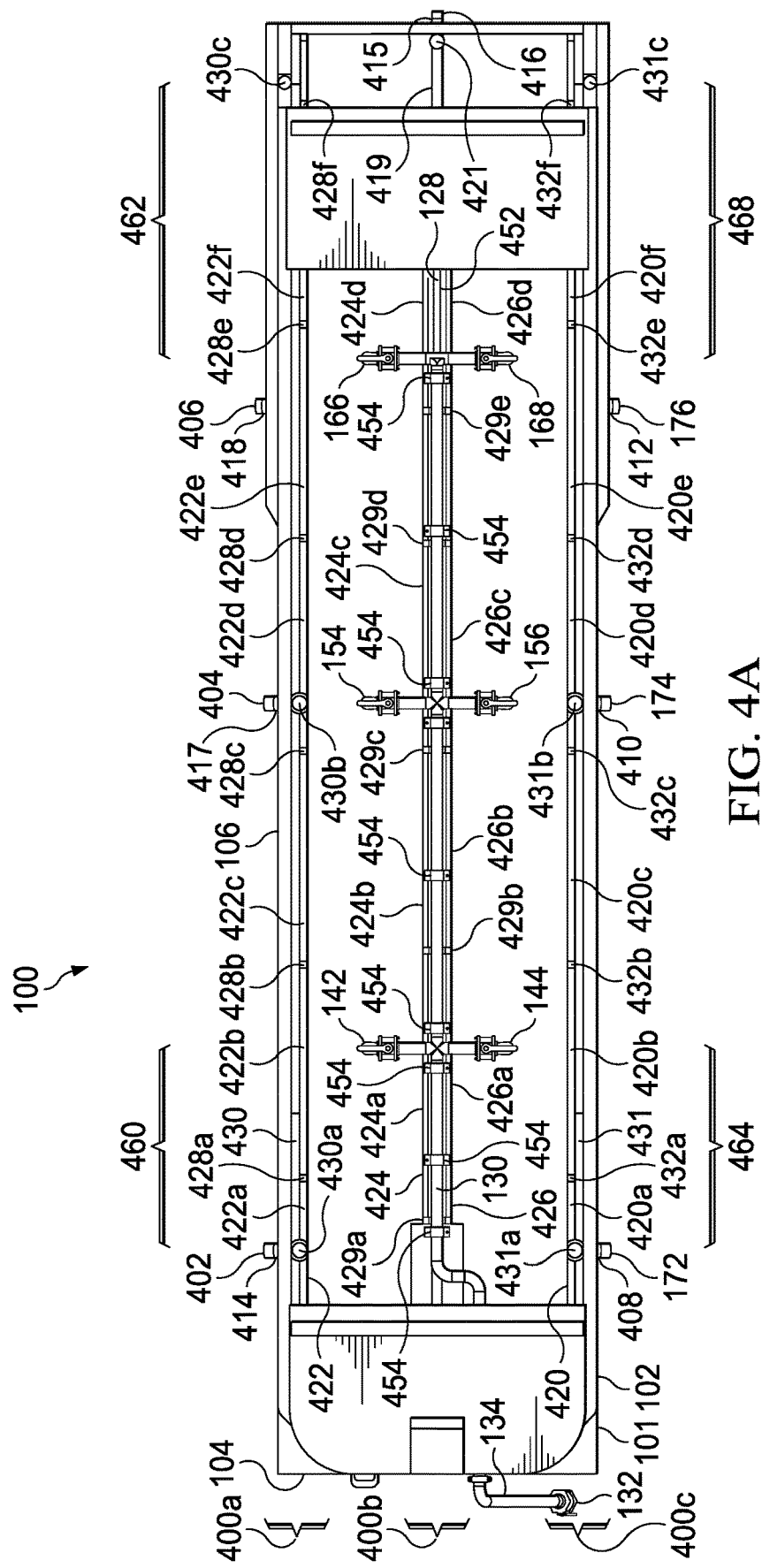
FIG. 4A is a plan view of a preferred embodiment of the even flow dewatering trailer.

Referring then to FIG. 4A, even flow dewatering trailer 100 will be further described.

Manifold 130 is rigidly positioned above center wall 128 by manifold support yoke 452, as will be further described. Manifold 130 is secured to manifold support yoke 452 by brackets 454. Manifold support yoke 452 is positioned directly above drain cover 419 in a planer relationship with rear drain port 416, as will be further described.

Filter sections 422, namely filter sections 422a, 422b, 422c, 422d, 422e, and 422f are positioned at a fixed distance away from and adjacent sidewall 106 by posts 428a, 428b, 428c, 428d, 428e and 428f. Each of the filter sections is ductedly connected to drain cavity 430. Drain cavity 430 is positioned directly beneath the starboard filter sections and is likewise ductedly connected with drain holes 430a, 430b, and 430c.

Drain cavity 430, drain holes 430a, 430b, and 430c, along with forward drain port 402, central drain port 404 and aft drain port 406 comprise starboard drain distribution system 400c.

Filter sections 420, namely filter sections 420a, 420b, 420c, 420d, 420e and 420f are positioned at a fixed distance away from and adjacent sidewall 102 by posts 432a, 432b, 432c, 432d, and 432e. Each of the filter sections is ductedly connected to drain cavity 431. Drain cavity 431 is positioned directly beneath the port filter sections and is ductedly connected to drain holes 431a, 431b, and 431c.

Drain cavity 431, drain holes 431a, 431b, and 431c, and forward drain port 172, central drain port 174 and aft drain port 176 further comprise port drain distribution system 400a.

Drain hole 430a is ductedly connected to valve 414 and forward drain port 402. Drain hole 430b is ductedly connected to valve 417 and central drain port 404. Drain hole 430c is ductedly connected to valve 418 and aft drain port 406.

Drain hole 431a is ductedly connected to valve 408, and forward drain port 172. Drain hole 431b is ductedly connected to valve 410 and central drain port 174. Drain hole 431c is ductedly connected to valve 412 and aft drain port 176.

Each of the valves is further connected to a bayonet mount hose connector, as known in the art.

Filter sections 424, namely filter sections 424a, 424b, 424c, and 424d are positioned at a fixed distance away from and adjacent center wall 128 by posts 429a, 429b, 429c, 429d and 429e. Likewise, filter section 426, namely filter sections 426a, 426b, 426c and 426d are positioned at a fixed distance away from and adjacent center wall 128 by posts 429a, 429b, 429c, 429d and 429e. Each of the filter sections is ductedly connected to a central drain cavity beneath drain cover 419 and supported by floor frame 108, as will be further described. The central drain cavity is positioned directly beneath center wall 128 and is ductedly connected to drain hole 421.

The central drain cavity beneath drain cover 419, drain hole 421 and rear drain port 416 further comprise central drain distribution system 400b.

Importantly, nozzle 142 is positioned behind forward drain port 402 by forward inlet drain offset 460. Likewise, nozzle 144 is positioned behind forward drain port 172 by forward inlet drain offset 464.

Nozzle 154, nozzle 156, central drain port 404 and central drain port 174, drain hole 430b and drain hole 431b are all arranged to be generally planer with each other and generally perpendicular with respect to the longitudinal axis of container body 101.

Drain hole 430c is positioned aft of nozzle 166 by aft inlet-drain offset 462. Likewise, drain hole 431c is positioned aft of nozzle 168 by aft inlet-drain offset 468. Drain hole 421 is positioned aft of drain holes 430c and 431c.

The forward inlet drain offsets and the aft inlet drain offsets, the generally planar positions of the central nozzles and drains and the central rear drain position are important to flow balancing and sediment level control, as will be further described.

In a preferred embodiment, the forward inlet drain offsets, and the aft inlet drain offsets, for a 30 foot trailer, range between approximately 5 and 7 feet. Likewise, for a 35 foot trailer, the forward inlet drain offsets and the aft inlet drain offsets range between approximately 6.1 to 7.9 feet. In other preferred embodiments of the invention, the forward inlet drain offsets and aft inlet drain offset are approximately equal. Further, for all container lengths the following equation generally applies.

$$x(\pm 15\%) = \frac{L}{5} \qquad \text{Eq. 1}$$

Where:
L=the container length; and,
x=forward inlet drain offset, and approximate aft inlet drain offset.

Dried sediment surface balance is further dependent on the ratio of the size of forward drain port 402, central drain port 404, aft drain port 406, forward drain port 172, central drain port 174, and aft drain port 176 to rear drain port 416. In a preferred embodiment, rear drain port 416 is about ⅓ diameter of the other drain ports. Most preferably rear drain port 416 is typically 1 inch in diameter to 3 inches diameter for the other drain ports.

In a preferred embodiment, inlet pipe 134 and manifold 130 piping is constructed of 3 inch aluminum tubing. Valves 408, 410, 412, 414, 415, 417 and 418 are preferably 3 inch Banjo valves having cam locks typical, preferably valve 415 and valve 502 are 1 inch Banjo valves, complete with cam locks typical.

Figure 4B:
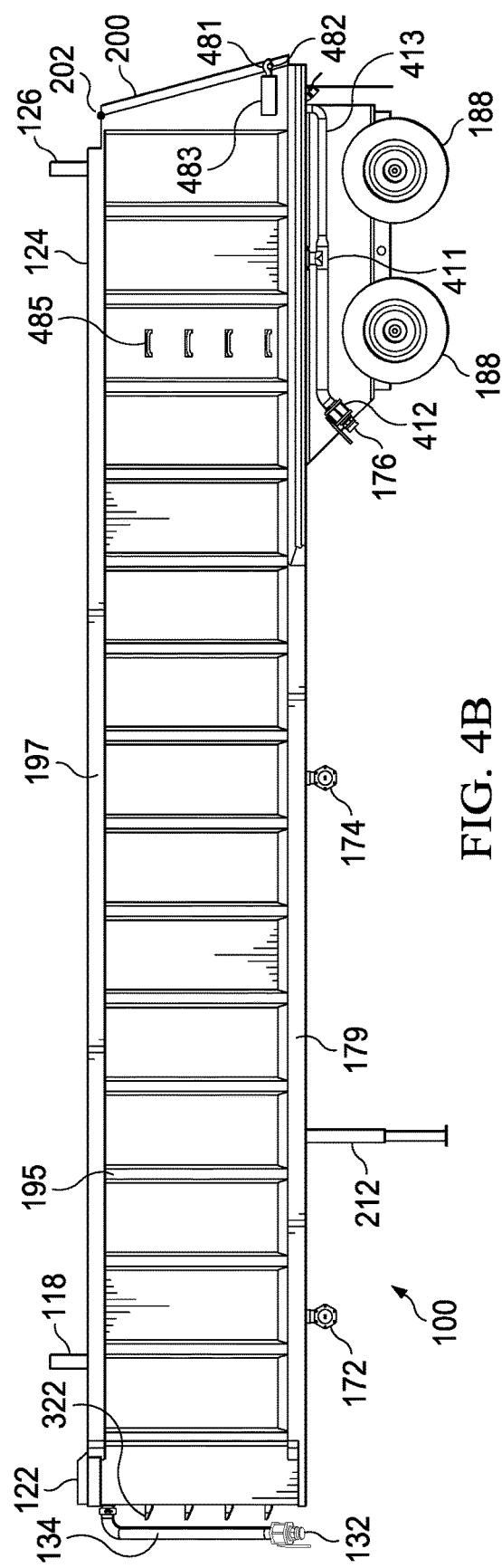
FIG. 4B is a port side view of a preferred embodiment of the even flow dewatering trailer.

Referring then FIGS. 4A and 4B, drain hole 431c is ductedly connected to aft drain port 176 and valve 412 by aft drain positioning pipe 413. Aft drain positioning pipe 413 is rigidly connected to floor frame 108 by bracket 411. Aft drain positioning pipe 413 positions valve 412 and aft drain port 176 forward of road wheels 188 in order to avoid interference by aft drain port 176 with raising and lowering the container body with respect to the half frame.

Rear gate 200 is secured to container body 101 by latch hook 481 engaged with lock pin 482. Lock pin 482 is rigidly fixed to rear gate 200. Latch hook 481 is operatively engaged with hydraulic cylinder 483. Hydraulic cylinder 483 is rigidly fixed to the container body. Hydraulic cylinder 483 and latch hook 481 cooperate to release or engage lock pin 482 thereby opening rear gate 200 or sealing rear gate 200 to the container body.

Access stair 485 is positioned on container body adjacent walkway 124.

Container body 101 further comprises parallel rub rails 197 and 179. Vertical support beams 195 are welded adjacent sidewall 102, between rub rail 197 and rub rail 179. In a preferred embodiment, the vertical support beams are on about 2 foot centers.

Figure 4C:
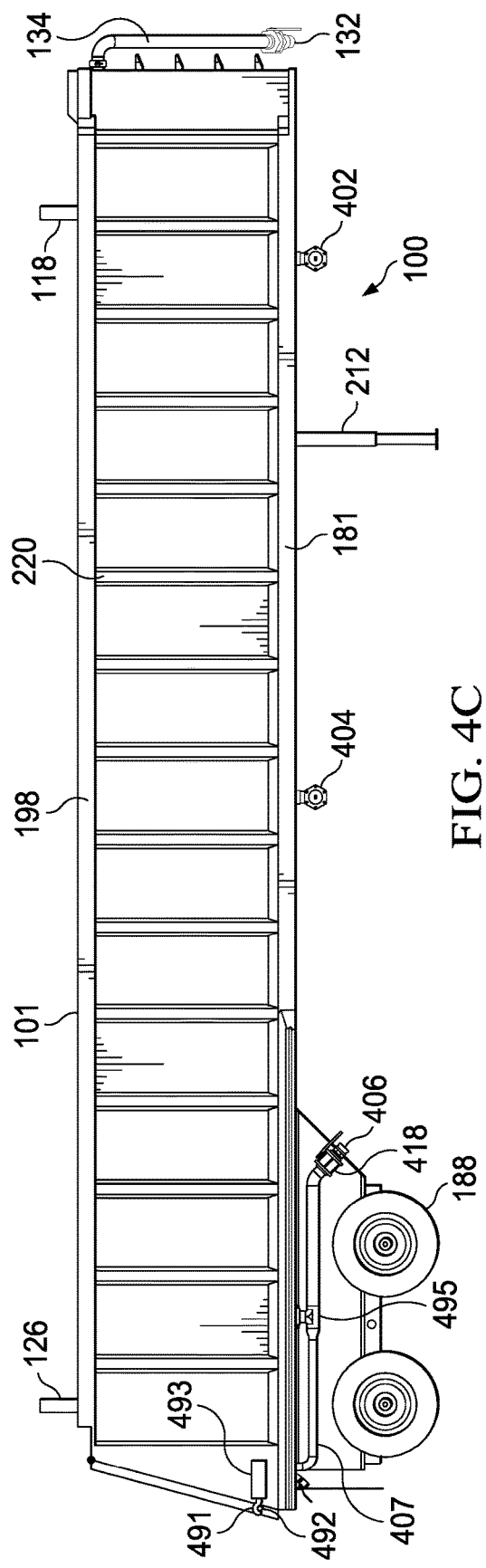
FIG. 4C is a starboard side view of a preferred embodiment of the even flow dewatering trailer.

Referring then FIGS. 4A and 4C, drain hole 430c is ductedly connected to aft drain port 406 and valve 418 by aft drain positioning pipe 407. Aft drain positioning of pipe 407 is rigidly connected to floor frame 108 by bracket 495.

Aft drain positioning pipe 407 positions valve 418 and aft drain port 406 forward of road wheels 188 in order to avoid interference by aft drain port 406 with raising and lowering the container body with respect to the half frame.

Rear gate 200 is secured to container body 101 by latch hook 491 engaged with lock pin 492. Lock pin 492 is rigidly fixed to rear gate 200. Latch hook 491 is operatively engaged with hydraulic cylinder 493. Hydraulic cylinder 493 is rigidly fixed to the container body. Hydraulic cylinder 493 and latch hook 491 cooperate to release or engage lock pin 492 thereby opening rear gate 200 or sealing rear gate 200 to the container body.

Container body 101 further comprises parallel rub rails 198 and 181. Vertical support beams 220 are welded adjacent sidewall 106 between rub rail 198 and rub rail 181. In a preferred embodiment, the vertical support beams are on about 2 foot centers.

Figure 5A:
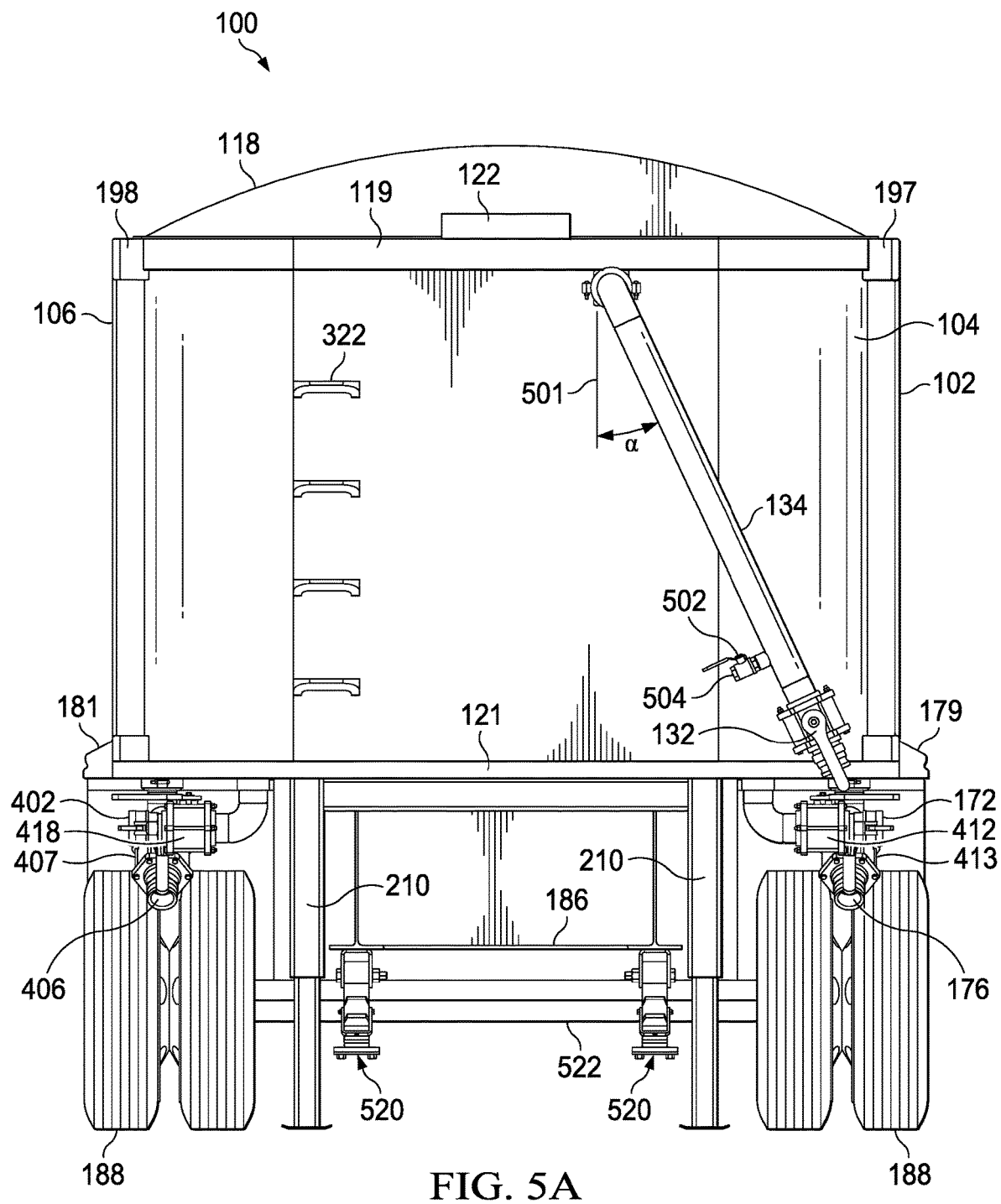
FIG. 5A is a front view of a preferred embodiment of the even flow dewatering trailer.

Referring then to FIG. 5A, even flow dewatering trailer 100 will be further described.

Suspension assembly 520 attaches axle assembly 522 to half frame 186. Axle assembly 522 is further connected to road wheels 188 and operatively supports road wheels 188.

Inlet pipe 134 is ductedly connected to valve 502 and inlet test port 504, adjacent inlet valve 132. Inlet pipe 134 is fixed to the central body at an angle α with respect to vertical axis 501. In a preferred embodiment, α is between about 70° and about 45°. Most probable angle α is about 65°.

Front wall 104 is rigidly attached to rub rail 119 and rub rail 121. Front wall 104, and sidewall 102 are rigidly attached to rub rail 197 and rub rail 179. Front wall 104 and sidewall 106 are rigidly attached to rub rail 198 and rub rail 181.

Figure 5B:
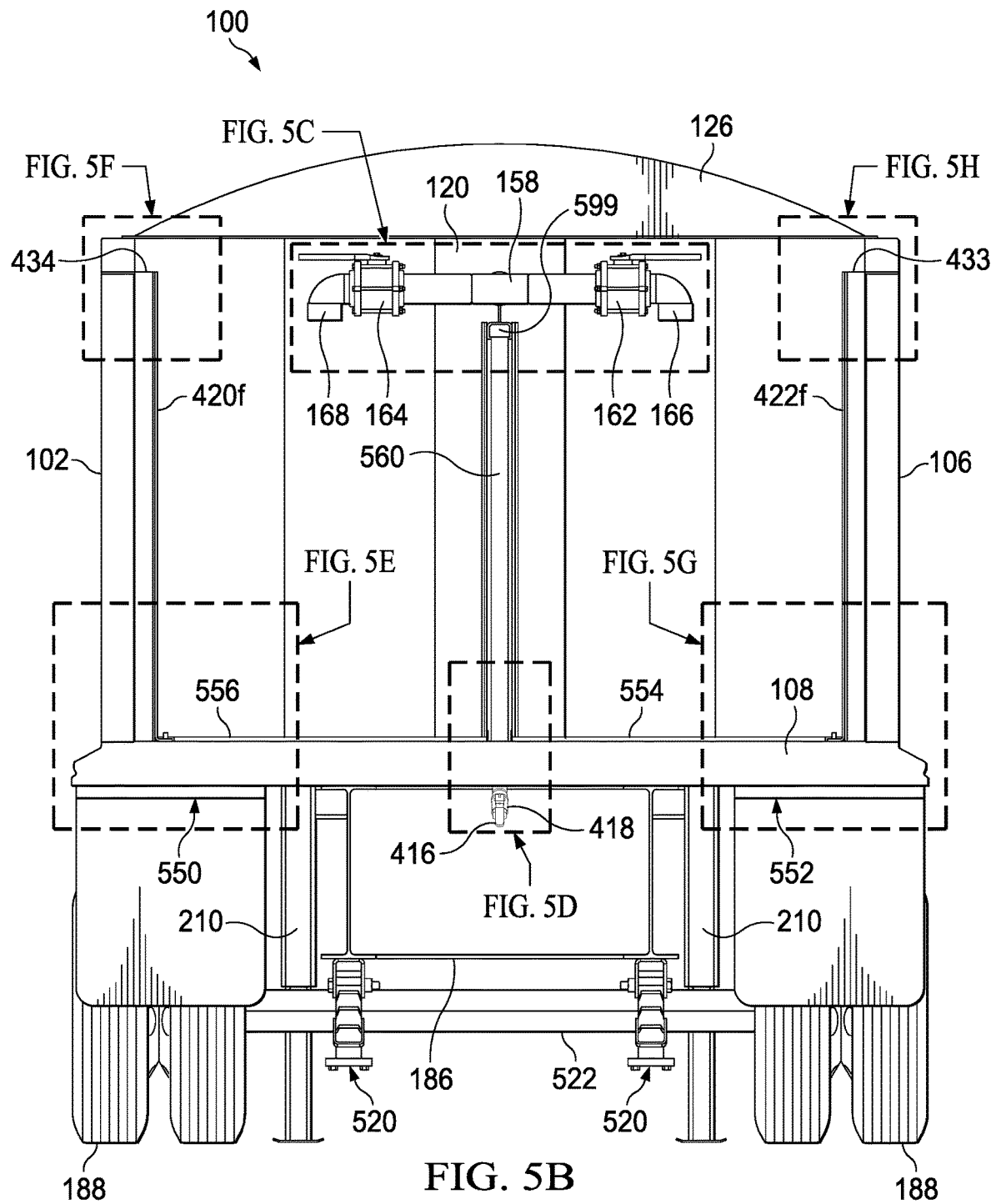
FIG. 5B is a rear view of a preferred embodiment of the even flow dewatering trailer.

Referring to FIG. 5B, low friction panel 554 is positioned adjacent floor frame 108 between filter sections 422 and 424. Low friction panel 556 is positioned adjacent floor frame 108, between filter sections 420 and 426. Each low friction panel runs the length of the container body. In a preferred embodiment the low friction panels are comprised of 40 mil Teflon® sheeting which is fixed to floor frame 108 by a suitable industrial adhesive. The low friction panels are important to reduce static friction between the dried sludge cake and the floor to aid in removal of the dried cake sludge from the trailer by gravity as the trailer is tilted.

Container body 101 is pivotally connected to half frame 186 by trailer pivot assembly 550 and trailer pivot assembly 552.

Each of filter sections 422a, 422b, 422c, 422d, 422e, and 422f are sealed by filter cap 433. Filter cap 433 runs the length of the container body. Likewise, filter sections 420a, 420b, 420c, 420d, 420e and 420f are sealed by the filter cap 434. Filter cap 434 runs the length of the container body. Each of filter sections 424a, 424b, 424c, 424d, 426a, 426b, 426c, and 426d are sealed by filter cap 599. Filter cap 599 runs the length of the container body.

FIG. 5B further shows details 5C, 5D, 5E, 5F and 5G, each of which will be further described.

Figure 5C:
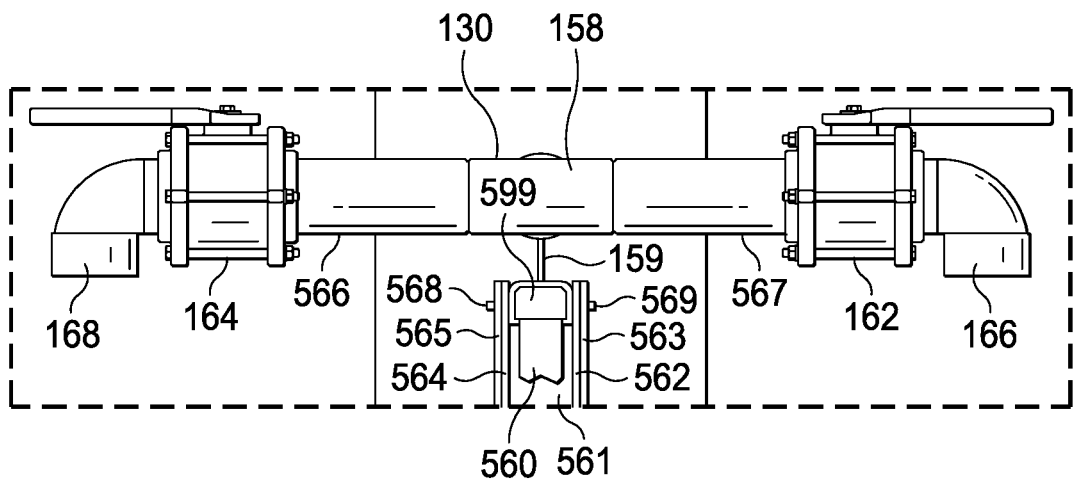
FIG. 5C is a detail view from FIG. 5B.
Figure 5D:
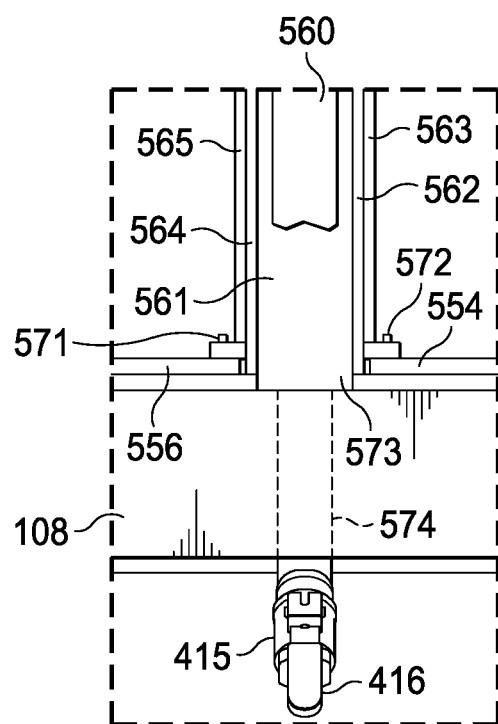
FIG. 5D is a detail view from FIG. 5B

Referring then to FIG. 5C and detail 5D, even flow dewatering trailer 100 will be further described.

T-fitting 158 is operatively connected to valve 162 and valve 164 by pipe 567 and pipe 566, respectively. The t-fitting is connected to manifold 130 by a cross fitting, as previously described. Manifold 130 is supported by manifold support yoke 159. Manifold support yoke 159 is further rigidly attached to filter cap 599. Cap 599 is rigidly attached to each of posts 429a, 429b, 429c, 429d, and 429e and runs the length of the center wall. In a preferred embodiment, manifold support yoke 159 is of longitudinal aluminum I-beam construction of dimensions 3 inch web by 1½ inch width.

Post 560 supports filter section 424d. Filter section 424d further comprises perforated panel 562 adjacent to filter media 563. Filter media 563 is held in place on perforated panel 562 by pin 569 and pin 572, as will be further described.

Post 560 further supports filter section 426d. Filter section 426d further comprises perforated panel 564 and filter media 565. Filter media 565 is attached to a perforated panel 564 by pin 568 and pin 571 as will be further described.

Perforated panel 564 and perforated panel 562, adjacent post 560 and floor frame 108, form drain cavity 561. Drain cavity 561 is ductedly connected by central drain 573 and pipe 574 to valve 415 and rear drain port 416. Pipe 574 is positioned through floor frame 108.

Each of filter sections 424a, 424b, 424c, 424d are similarly structured and similarly attached by a plurality of removable pins to posts 429a, 429b, 429c, 429d and 429e. Likewise, filter sections 426a, 426b, 426c, and 426d are similarly structured and similarly attached to posts 429a, 429b, 429c, 429d, and 429e by a plurality of removable pins. In other preferred embodiments, a compression frame may also be employed to stabilize the filter sections, as will be further described.

Figure 5E:
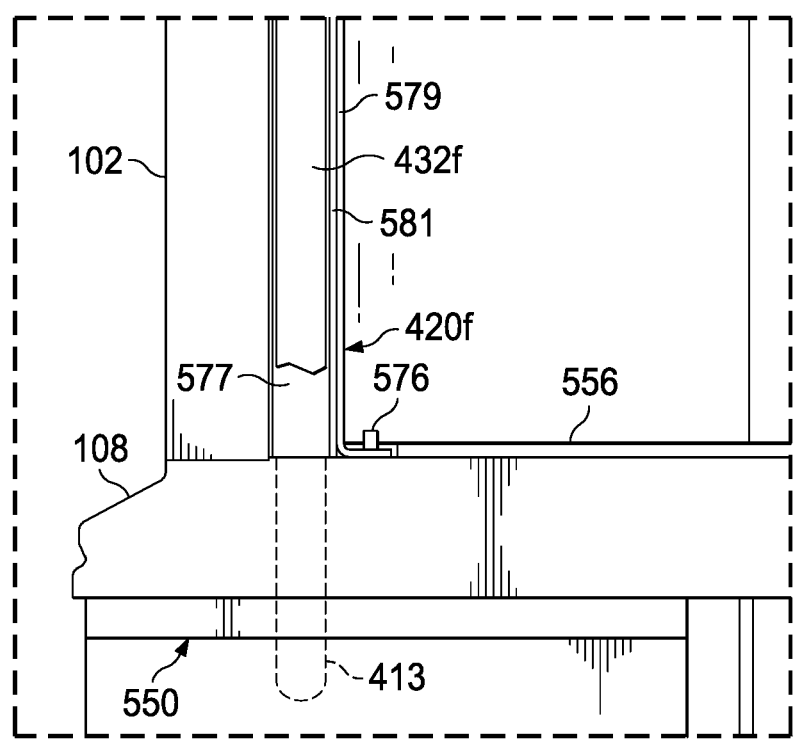
FIG. 5E is a detail view from FIG. 5B.
Figure 5F:
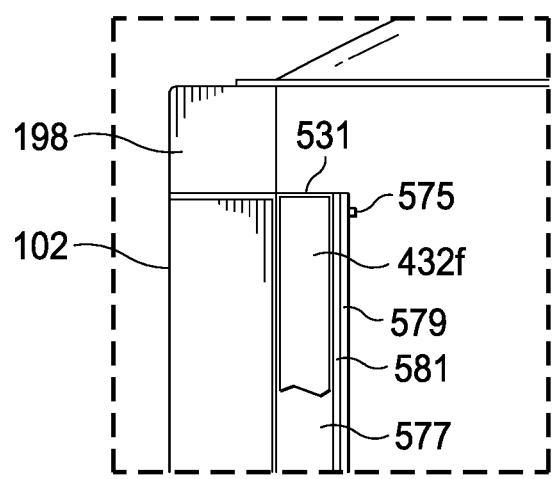
FIG. 5F is a detail view from FIG. 5B.

Referring to FIGS. 5E and 5F, even flow dewatering trailer 100 will be further described. Post 432f supports filter section 420f. Filter section 420f further comprises filter media 579 and is held adjacent perforated panel 581 by pin 575 and pin 576. Pin 576 is removably positioned through low friction panel 556 into the floor. Pin 575 is removably positioned through the perforated panel and the filter media into post 432f. Drain cavity 577 is ductedly connected to aft drain positioning pipe 413 through floor frame 108.

Drain cavity 577 is created between perforated panel 581 and sidewall 102. Drain cavity 577 is terminated by filter cap 531, positioned atop post 432f.

In the same way, filter sections 420a, 420b, 420c, 420d, 420e, and 420f are similarly structured and are held in position at posts 432a, 432b, 432c, 432d, 432e, and 432f, respectively, by a plurality of removable pins. In other preferred embodiments, a compression frame may also be employed to stabilize the filter sections, as will be further described.

Figure 5G:
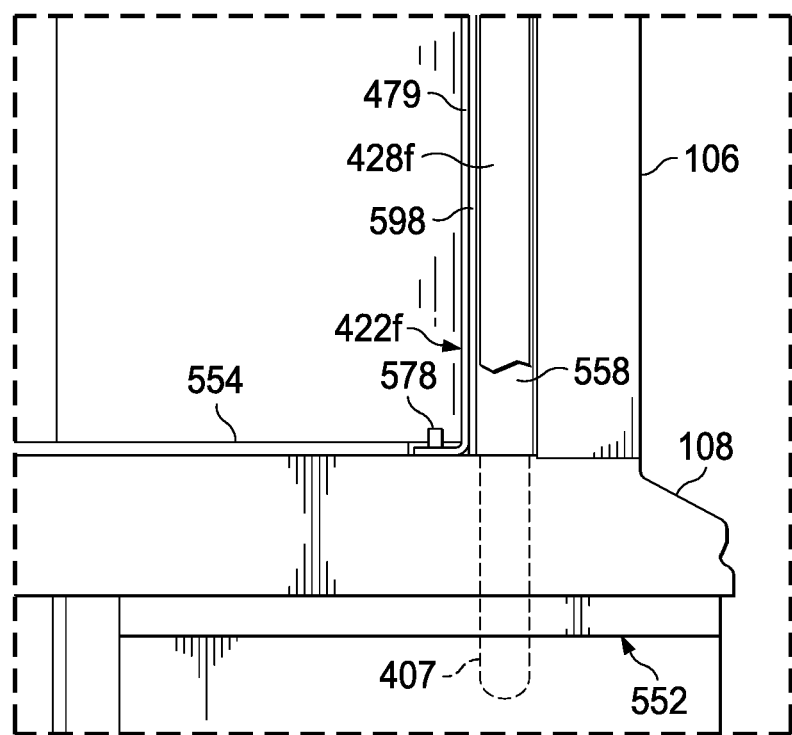
FIG. 5G is a detail view from FIG. 5B.
Figure 5H:
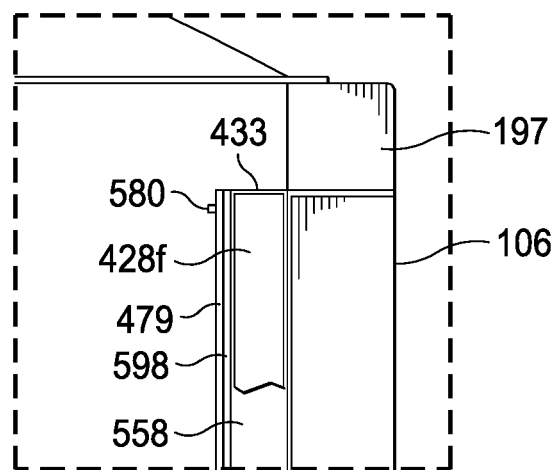
FIG. 5H is a detail view from FIG. 5B

Referring to FIGS. 5G and 5H, even flow dewatering trailer 100 will be further described. Post 428f supports filter section 422f. Filter section 422f further comprises perforated panel 598 is positioned adjacent post 428f. Filter media 479 is held adjacent perforated panel 598 by removable pins 580 and 578.

Perforated panel 598 and sidewall 106 create drain cavity 558. Drain cavity 558 is ductedly connected to aft frame positioning pipe 407 through floor frame 108.

Perforated panel 598 is held in position by removable pin 578 attached to low friction panel 554 and floor frame 108, and removable pin 580 removably secured to post 428f. Likewise, filter sections 422a, 422b, 422c, 422d, 422e, and 422f are similarly structured and are held in position by posts 428a, 428b, 428c, 428d, 428e, and 428f, respectively, and floor frame 108 by a plurality of removable pins. In other preferred embodiments, a compression frame may also be employed to stabilize the filter sections, as will be further described.

Figure 5I:
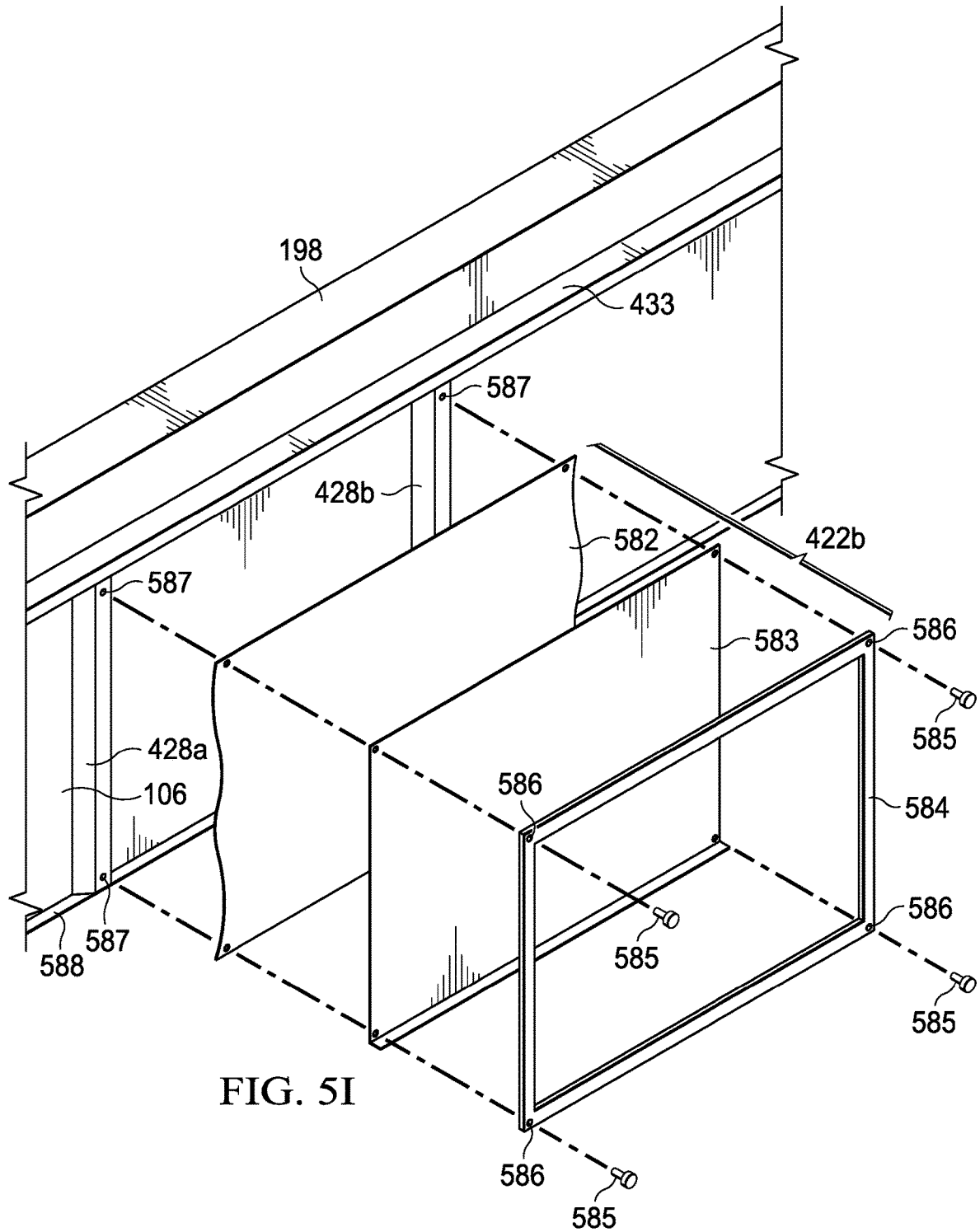
FIG. 5I is an exploded view of a preferred embodiment of a filter section.

Referring them to FIG. 5I, filter section 422b will be further described, as an example of a preferred embodiment of the typical construction of filter sections 420a through 420f, 426a through 426d, 424a through 424d and 422a through 422f.

Filter section 422b comprises perforated panel 582. In a preferred embodiment, the perforated panel further comprises expanded metal sheeting bonded to perforated aluminum sheeting with a suitable industrial adhesive. In another preferred embodiment, perforated panel 582 is comprised of aluminum perforated plate alone. Filter media 583 is positioned adjacent perforated panel 582. Filter media 583 is preferably comprised of polyethylene sheeting, approximately 100 mils in thickness comprising a mesh in a range between about 600 microns and about 300 microns (30 mesh to 50 mesh). Perforated panel 582 and filter media 583 are held in position against post 428a and post 428b by compression frame 584. Compression frame 584 is preferable 2 inch aluminum plate having welded mitered corners. Compression frame 584 is fastened to filter media 583, perforated panel 582, and posts 428a and 428b by removable pins 585. In a preferred embodiment, pins 585 pass through holes 586 and are removably secured in holes 587. Filter section 422b is positioned adjacent drain channel 588 which runs between and underneath post 428a and 428b. Posts 428a and 428b are held in position adjacent sidewall 106 by filter cap 433, where they are welded in place adjacent sidewall 106.

Referring then to FIG. 6A, a schematic diagram of the phenomenon of inlet driven sediment stacking, as recognized by the inventors, will be described.

FIG. 6A shows test container 601 including single sludge inlet 602 and liquid drains 603, 604, and 605.

Inlet sludge is introduced into test container 601 along sludge flow 606. In liquid form, sludge flows evenly toward liquid drains 603, 604 and 605. However, over a very short period of time, sediment debris collects or "stacks" against liquid drains 603, 604 and 605 creating uneven sediment stack surface 607.

Uneven sediment stack surface 607 includes raised portions 608, 609 and 610 and lower portions 611 and 612. When the container is in use, the stack surface approaches the top of the container as the container is filled with sludge. However, raised portions 608, 609 and 610 reach the top of the container before lower portions 611 and 612. When raised portions 608, 609, and 610 reach the top of the container, the container is considered "full" and then is sealed for drying and transport. However, the test container is not full because sediment is absent from lower portions 611 and 612.

Referring to FIG. 6B, a schematic diagram of test container 620 will be described. Test container 620 includes sludge inlets 622, 624 and 626, and a single liquid drain 657.

Liquid sludge enters through sludge inlets 622, 624 and 626 and moves along sludge flow 630, 632 and 634 toward single liquid drain 657.

Upon entering the container, sludge flow 630, 632 and 634 create semi-toroidal splashes forming raised sections 640a and 640b, 642a and 642b, and 644a and 644b to form uneven sludge sediment stack surface 656.

As test container 620 is filled, the raised portions of uneven sludge sediment stack surface 656, namely raised sections 640a, 640b, 642a, 642b, 644a, and 644b reach the top of the container first, thereby leaving lower portions 650, 651, 652, 653, 654 and 655 unfilled. Hence when the container is transported, it is not completely full.

Referring to FIG. 6C, a schematic diagram of test container 660 will be described. Test container 660 is a schematic diagram of a preferred embodiment of the invention.

Test container 660 includes sludge inlets 662, 664 and 666. Test container 660 further comprises liquid drains 670, 672, and 674. Sludge inlet 662 is positioned aft of drain 670 by forward inlet drain offset 693. Likewise, drain 674 is positioned aft of sludge inlet 666 by aft inlet drain offset 694. Sludge inlet 664 and drain 672 are positioned in transverse plane 696.

Liquid sludge enters along sludge flow 676, 678 and 680. Each of the flow paths creates a semi-toroidal splash pattern, as previously described.

Sludge flow 676 moves toward drains 670 and 672 along flow paths 682 and 684. Sludge flow 678 moves toward drain 672 along flow paths 686 and 688. Sludge flow 680 moves toward drains 672 and 674 along flow paths 690 and 692.

As can be seen from the figure, sludge sediment stack surface 695 is approximately flat within test container 660. As test container 660 is filled, sludge sediment stack surface 695 reaches the top of the container equally along its top surface, thereby filling the container more completely for transport. It is estimated that sludge sediment stack surface 695 fills the container 5% to 20% more efficiently than the examples of FIGS. 6A and 6B.

Hence, a preferred embodiment of the invention automatically creates a positionally balanced sediment deposit by virtue of the forward inlet drain offset 693, the positioning of sludge inlet 664 and drain 672 along transverse plane 696 and aft inlet drain offset 694. The relative positions of the inlets and drains is important because it requires no automatic controls or manual adjustment of the inlet or drain flow rates to obtain a balanced sediment loading. As a result of the flow balance between the inlet ports and the drains, the sediment level automatically rises with a roughly planer top surface to the top of the container, thereby filling the container completely for transport. A completely filled container more efficiently utilizes container capacity and so reduces the number of trips required over time to transport any given amount of sludge cake. Further, a reduced number of trips reduces the tipping costs, trailer maintenance costs and fuel costs paid for transport of dried sludge over time.

Figure 7A:
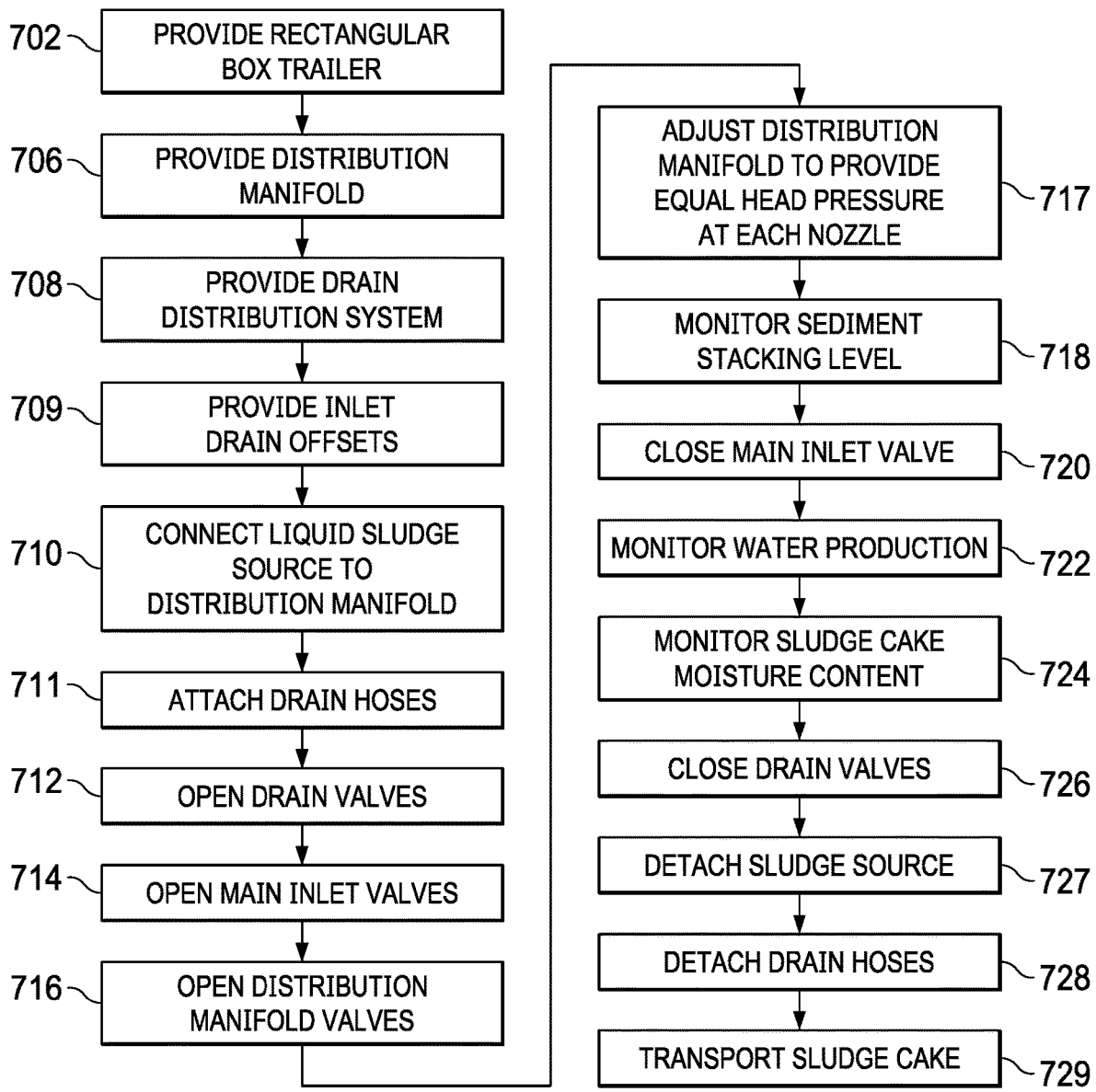
FIG. 7A is a flowchart of method steps for use of a preferred embodiment.

Referring then to FIG. 7A a preferred method of use of even flow dewatering trailer 100 will be further described.

At step 702, a rectangular box trailer, as previously described, is provided. At step 706, the rectangular box trailer is provided with an inlet distribution manifold such as manifold 130.

At step 708, the rectangular box trailer is provided with a drain distribution system comprising a port drain distribution system, a central drain distribution system and a starboard drain distribution system, as previously described.

At step 709, the inlet nozzles on the inlet manifold and drains are arranged so as to provide forward inlet drain offsets and rear inlet drain offsets, as previously described.

At step 710, the liquid sludge source is connected to the distribution manifold.

At step 711, drain hoses are attached to all drains.

At step 712, all drain valves to the port drain distribution system, the central drain distribution system and the port drain distribution system are opened. At step 714, the main inlet valve to the distribution manifold is opened.

At step 716, all valves to the distribution manifold are opened. At step 717, optionally, the forward manifold valves, the aft manifold valves and the central manifold valves are throttled to provide equal head pressure at each inlet nozzle. In a preferred embodiment the forward manifold valves are throttled by about 20%, and the central manifold valves are throttled by about 10%. In other embodiments, flow rates can be manually determined with a handheld flow meter and all manifold valves may be adjusted to provide equal flow rates at each nozzle.

At step 718, the sediment stacking level is monitored.

At step 720, when the sediment stacking level has reached the top of the trailer, the main inlet valve is closed.

At step 722, water production from the drains is monitored. At step 724, the sludge cake moisture content is monitored.

At step 726, the drain valves are closed when the sludge cake moisture content is sufficiently low.

At step 727, the sludge source is detached from the inlet manifold. At step 728, the drain hoses are detached.

At step 729, the trailer is attached to a transport, the landing gear is retracted and the trailer is towed to a disposal site.

Figure 7B:
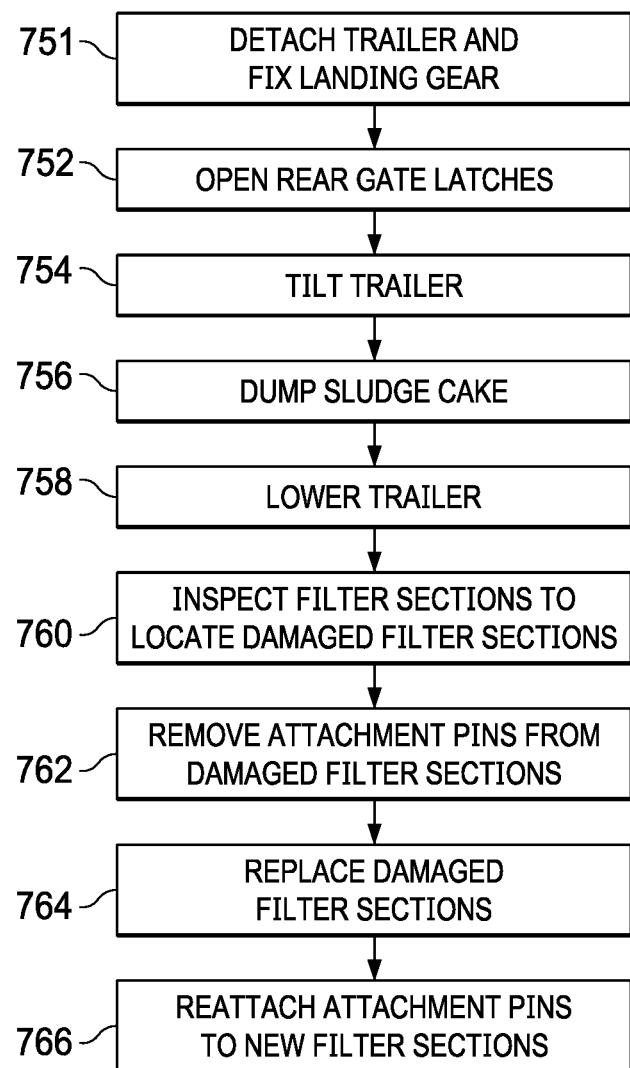
FIG. 7B is a flowchart of method steps for use of a preferred embodiment.

Referring then to FIG. 7B, a method of use of the even flow dewatering trailer will be described.

At step 751, the trailer is detached from the transport and the landing gear is fixed in position.

At step 752, all rear gate latches are opened.

At step 754, the hoist lift cylinder is activated, thereby tilting the trailer.

At step 756, the dried sludge cake is removed through the rear of the container, under the rear gate, by sliding down the low friction panels under the force of gravity.

At step 758, the trailer is lowered down.

At step 760, all filter sections are inspected to locate damaged sections and undamaged sections.

At step 762, the attachment pins for all damaged filter sections are removed.

At step 764, all damaged filter sections are replaced. The undamaged filter sections are not replaced.

At step 766, the attachment pins are reattached to hold the new filter sections in place in the trailer.

The invention claimed is:

1. An even flow dewatering trailer apparatus comprising:
a frame, operatively supporting a set of road wheels;
a container body, pivotally attached to the frame;
the container body further supporting a central wall defining a port bay and a starboard bay;
a set of port side filter sections, attached to the container body;
a set of starboard side filter sections, attached to the container body;
a set of center filter sections, attached to the central wall;
a port side drain cavity, in the container body, ductedly connected to the port bay through the set of port side filter sections;
a starboard side drain cavity, in the container body, ductedly connected to the starboard bay through the set of starboard side filter sections;
a central drain cavity, in the container body, ductedly connected to the port bay and the starboard bay through the set of center filter sections;
an inlet distribution manifold, rigidly attached to the central wall, directed equally into the port bay and the starboard bay;
a drain distribution system ductedly connected to the port side drain cavity, the starboard side drain cavity and the central drain cavity;
a forward inlet drain offset between the inlet distribution manifold and the drain distribution system;
an aft inlet drain offset between the inlet distribution manifold and the drain distribution system;
wherein the forward inlet drain offset and the aft inlet drain offset positionally balance a sediment deposit layer surface within the port bay and the starboard bay;
wherein the inlet distribution manifold further comprises:
a set of forward nozzles;
a set of central nozzles; and,
a set of aft nozzles;
wherein the drain distribution system further comprises:
a set of forward drain ports, positioned forward of the set of forward nozzles, by the forward inlet drain offset;
a set of central drain ports, positioned coplanar with the set of central nozzles; and a set of aft drain ports, positioned aft of the set of aft nozzles, by the aft inlet drain offset.

2. The even flow dewatering trailer apparatus of claim 1 wherein the drain distribution system further comprises:
a set of rear drain ports, positioned aft of the set of aft drain ports, ductedly connected to the central drain cavity.

3. The even flow dewatering trailer apparatus of claim 2 wherein:
each forward drain port of the set of forward drain ports, each aft drain port of the set of aft drain ports, and each central drain port of the set of central drain ports has a first diameter;
each rear drain port of the set of rear drain ports has a second diameter; and,
the first diameter and the second diameter exhibit a ratio of about 3 to about 1.

4. The even flow dewatering trailer apparatus of claim 1 wherein:
each nozzle of the set of forward nozzles is ball valve actuated;
each nozzle of the set of central nozzles is ball valve actuated; and,
each nozzle of the set of aft nozzles is ball valve actuated.

5. The even flow dewatering trailer apparatus of claim 1 wherein:
each forward drain port of the set of forward drain ports is ball valve actuated;
each central drain port of the set of central drain ports is ball valve actuated; and,
each aft drain port of the set of aft drain ports is ball valve actuated.

6. The even flow dewatering trailer apparatus of claim 1 wherein:
the set of aft drain ports further comprises a port aft drain port and a starboard aft drain port;
wherein the port aft drain port is ductedly connected to a first forward biased aft drain pipe, attached to the container body and extending forward of the set of road wheels; and,
wherein the starboard aft drain port is ductedly connected to a second forward biased aft drain pipe, attached to the container body and extending forward of the set of road wheels.

7. The even flow dewatering trailer apparatus of claim 1 wherein the forward inlet drain offset is defined by:

$$x = \frac{L}{5}$$

where:
x is the forward inlet drain offset ±5%; and,
L is a length of the container body.

8. The even flow dewatering trailer apparatus of claim 1 wherein the aft inlet drain offset is defined by:

$$x = \frac{L}{5}$$

where:
x is the aft inlet drain offset ±5%; and,
L is a length of the container body.

9. The even flow dewatering trailer apparatus of claim 1 wherein the forward inlet drain offset is between about 4 and about 9 feet.

10. The even flow dewatering trailer apparatus of claim 1 wherein the aft inlet drain offset is between about 4 and about 9 feet.

11. The even flow dewatering trailer apparatus of claim 1 wherein the forward inlet drain offset and the aft inlet drain offset are about equal.

12. The even flow dewatering trailer apparatus of claim 1 wherein:
each port side filter section of the set of port side filter sections is removable separately from the set of starboard side filter sections and the set of center filter sections;
each starboard side filter section of the set of starboard side filter sections is removable separately from the set of port side filter sections and the set of center filter sections; and,
each center filter section of the set of center filter sections is removable separately from the set of port side filter sections and the set of starboard side filter sections.

13. The even flow dewatering trailer apparatus of claim 1 wherein each port side filter section of the set of port side filter sections, each starboard side filter section of the set of starboard side filter sections and each center filter section of the set of center filter sections further comprises:
a semi-rigid perforated panel adjacent a flexible filter media.

14. The even flow dewatering trailer apparatus of claim 13 wherein the flexible filter media is removable.

15. The even flow dewatering trailer apparatus of claim 13 wherein the flexible filter media is supported by a compression frame.

16. The even flow dewatering trailer apparatus of claim 13 wherein the flexible filter media is about 30 to about 50 mesh.

17. The even flow dewatering trailer apparatus of claim 1 wherein:
the inlet distribution manifold further comprises a valve actuated inlet pipe which is positioned adjacent the container body at an angle of about 45° to 70° relative to a vertical axis of the container body.

18. The even flow dewatering trailer apparatus of claim 1 wherein:
the port bay further comprises a first low friction floor layer and wherein the starboard bay further comprises a second low friction floor layer.

* * * * *